Oct. 27, 1959    L. E. ELKINS ET AL    2,910,123
METHOD OF RECOVERING PETROLEUM

Filed Aug. 20, 1956    2 Sheets-Sheet 1

INVENTORS
LLOYD E. ELKINS
THEODORE M. GEFFEN
BY
*Buell C. Hamilton*
ATTORNEY

Oct. 27, 1959  L. E. ELKINS ET AL  2,910,123
METHOD OF RECOVERING PETROLEUM
Filed Aug. 20, 1956  2 Sheets-Sheet 2

INVENTORS
LLOYD E. ELKINS
THEODORE M. GEFFEN
BY
ATTORNEY

United States Patent Office 2,910,123
Patented Oct. 27, 1959

2,910,123

METHOD OF RECOVERING PETROLEUM

Lloyd E. Elkins and Theodore M. Geffen, Tulsa, Okla., assignors to Pan American Petroleum Corporation, a corporation of Delaware Application August 20, 1956, Serial No. 605,157

4 Claims. (Cl. 166—9)

This invention pertains to the art of recovering viscous hydrocarbon oil from underground formations. More specifically, it relates to a process for initiating and supporting or for augmenting the flow of the viscous oil toward a point in the formation from which point the oil is recovered.

Various methods have been devised for recovering oil from its native formation when natural conditions will not support an economical migration rate of the fluid toward a recovery point. These methods are usually termed "secondary" recovery methods and consist of injecting a fluid in an injection well to displace oil within the formation toward a producing well. The "secondary" recovery methods may use air, gas, liquids immiscible with the formation oil, liquids miscible with the formation oil, or a combination of these fluids as a displacement medium. The present art teaches injecting the fluid medium in the formation to form a somewhat vertical bank, or frontal drive, having on its back side the injected fluid and on its front side the formation oil. Thus the injected fluid partially fills each pore space as the oil is displaced. These "secondary" recovery methods depend on maintaining a differential pressure between the injected displacement medium and the formation oil to achieve an economical oil recovery rate. This differential pressure is dependent upon numerous variables such as formation permeability, distance between injection and producing wells, viscosity of injected fluid, and viscosity of fluid within the formation, to name a few. Higher differential pressures are required to maintain an economic flow rate of oils having higher viscosities. For a particular well spacing, oil having a viscosity above a certain value cannot be produced at an economical rate with any reasonable injection pressure. For example, in a formation 10 feet thick which is found at approximately 1000 feet below the surface having a permeability of 500 millidarcys and with a well spacing of about 330 feet between injection and producing wells a pressure differential of about 1000 p.s.i. between the wells is required to cause an oil of about 500 cps. viscosity to flow into the producing well at an economical rate. For example, in some areas this rate might be about 5 barrels of oil per day. This would be initial flush production and would probably fall off rapidly as the flooding liquid enters the formation pore space.

It is an object of this invention to provide an improved process for recovering viscous oil from its native formation on an economical basis. It is a more specific object of this invention to provide a method for recovering viscous oil in which the oil need not be displaced in the natural rock in a horizontal direction.

The procedure herein set forth, as embodying this invention, involves drilling a well in the formation, and then selectively fracturing the lower portion of the formation. In the process of selectively creating a fracture, a formation packer, either single or dual, is located and set in the well on the tubing to isolate and confine a selected formation interval which is to be fractured. A fracturing fluid, preferably a low-penetrating fluid, is then prepared and pumped into the well. This fluid, when it reaches the formation which is to be fractured, tends to stay in the well and build up a high pressure due to both the high viscosity of formation oil and to retarded tendency of the low-penetrating fluid, if used, to penetrate the interstices of the formation. Some slight penetration of the formation interstices is sometimes considered desirable, since it is believed to assist in obtaining a fracture by increasing the area exposed to the high pressure fracturing fluid. As pumping or injecting of fluid into the well continues after the low-penetrating fluid reaches the selected formation, the bottom-hole pressure rises until the formation breakdown pressure is reached, at which time, as a general rule, the surface pressure decreases and continues at a substantially constant value. More fracturing fluid may be injected, extending the fracture. This procedure is set out more in detail and claimed in U.S. Patent 2,596,843 Farris. U.S. Patent 2,596,844 Clark teaches and claims a procedure similar to the above-mentioned patent.

A formation fracture may be formed by under-reaming a selected portion of the borehole in the formation at the desired interval. This weakens the formation and increases the area subjected to lifting forces when hydrostatic pressure is applied. A liquid, subjected to a sufficient hydraulic pressure, is then pumped into the selected portion of the formation and the fracture is thus formed. This procedure is set out more in detail in U.S. Patent 2,699,212 Dismukes.

It is obvious from the above examples that numerous means presently exist to create a fracture in a formation at a desired interval and therefore any of various means may be applied to create the formation fracture. This fracturing step creates a disk-shaped fracture which extends radially from the well and normally lies in a horizontal plane which is substantially parallel to the bottom of the formation. It is desirable to create a fracture with high capacity to conduct fluids with small pressure drops. The fracture permeability may be increased by using large spherical propping agents such as silica.

Following the fracturing step, one or more wells are drilled in the formation within the area described by the fracture. A solvent, preferably volatile, is introduced into one of the wells, hereinafter termed an injection well, at a pressure sufficient to establish circulation of the solvent between the injection well and one of the adjacent wells, hereinafter termed a producing well, via the permeable flow channel created by the formation fracture. The solvent, in traveling through the fracture, dilutes the viscous oil within and adjacent the fracture and transports the oil to the producing well from which point the oil and solvent mixture is recovered. This mixture, upon reaching the surface, is separated into its component parts by conventional methods such as distillation, extraction, or the like.

It is to be understood that the preliminary steps, as outlined above, of drilling a well, forming a fracture, and then drilling additional wells may be varied without departing from the spirit of this invention. For example, all the wells may be drilled prior to forming a fracture. It is not essential that the fracture be formed from the injection well as, for example, a fracture may be formed from a producing well toward, or completely into, the injection well. A fracturing procedure may be applied to each well, or selected wells. The primary purpose of the fracture is to establish an initial permeability sufficient for fluid flow between the wells with small differential pressures.

It may sometimes be beneficial to block off the vertical permeability extending from the fracture adjacent the injection well for a short distance of 10 to 25 feet in order to prevent flooding and conserve the injected solvent. This may be accomplished by addition of a resin-forming liquid such as phenol-formaldehyde which is capable of transformation into a solid resin. This material may be spotted in the tubing and displaced into the fracture by using a viscous displacement medium such as crude oil. Examples of appropriate materials and methods of applying the materials are set out in U.S. Patent 2,378,817 Wrightsman. Other suitable materials are set out in U.S. Patent 2,274,297 Irons.

Figure 1:
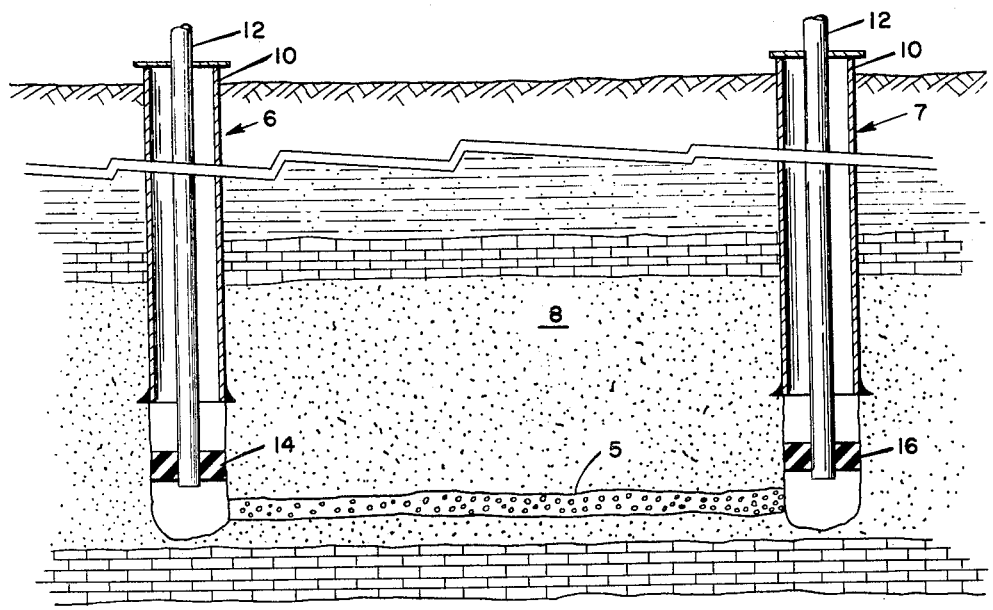
Figure 1 is a horizontal view, partially in cross-section, of a viscous oil-bearing formation with its cap rock and overburden. The figure illustrates the injection well, the producing well and the formation fracture which has been placed in the lower portion of the oil-bearing formation.

Figure 1 illustrates the preferred embodiment of existing conditions prior to the application of this invention. The formation fracture 5 is shown as extending between the injection well 6 and the producing well 7 within the formation 8. The injection and producing wells may be completed with casing 10 set such that an open hole section remains, as shown in the illustration, or the casing string may be set through the formation and the zones of interest perforated in a conventional manner. A packer 14 may optionally be placed within the injection well to confine the solvent to the fracture and eliminate the tendency of the solvent to flood the zone adjacent the injection well. A packer 16 may optionally be placed within the producing well to prevent excess coning of the solvent-oil mixture as it enters the well bore.

Figure 2:
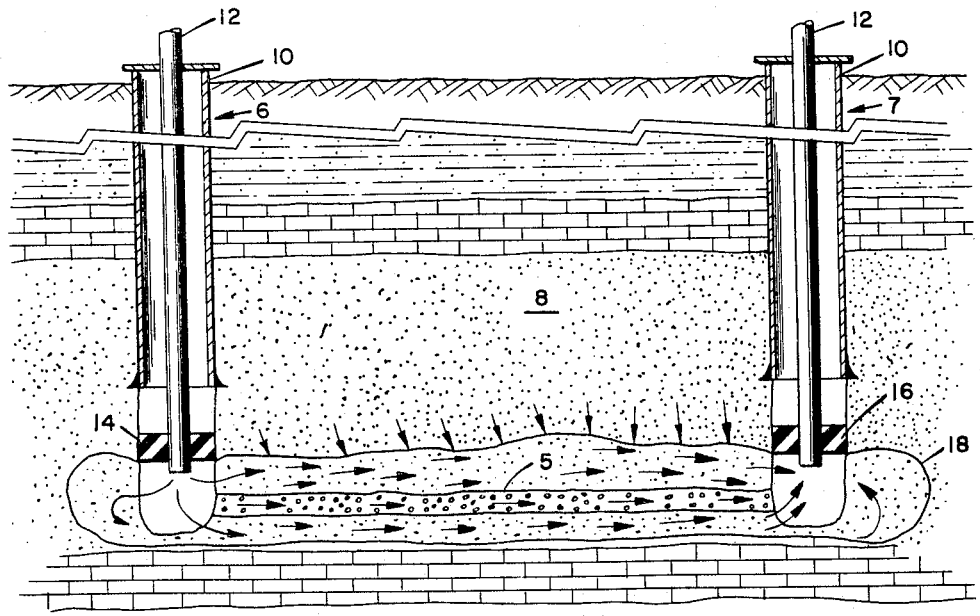
Figure 2 is a view similar to Figure 1 except it illustrates the effective drainage chamber created by the circulation of a volatile solvent through the formation fracture.

Figure 2 illustrates the formation drainage chamber 18, which is formed by the circulation of the solvent from the injection well through the formation fracture and into the producing well.

Figure 3:
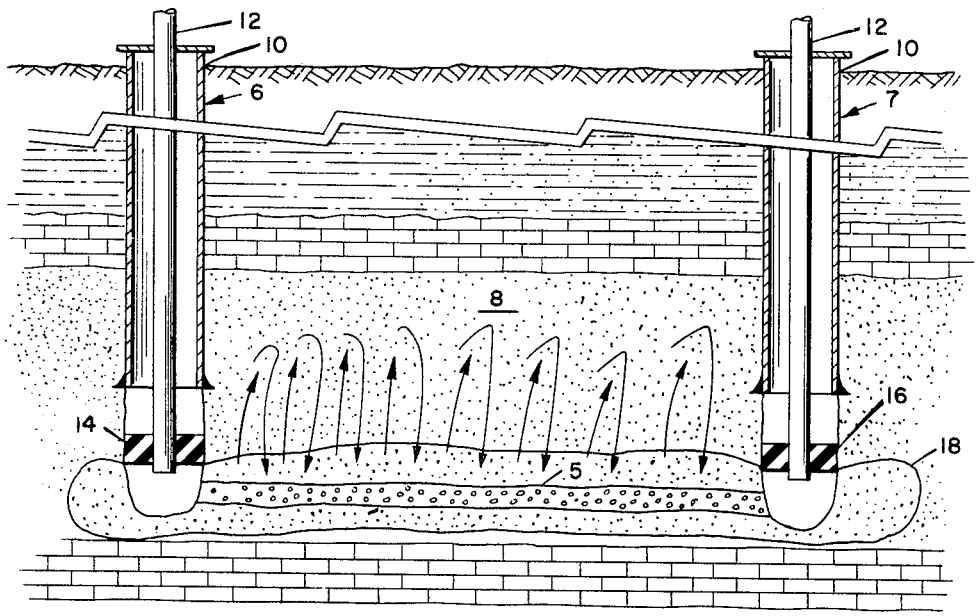
Figure 3 is a view similar to Figure 2 except the arrows diagrammatically illustrate the operation of the volatile components of the solvent in passing upward into the overlying formation, diluting the viscous oil and passing downward in solution with the viscous oil into the drainage chamber.

In outlining the procedure embodying this invention, the formation with its residual oil is in a state, whereby the viscous oil, under natural conditions, will only move into the producing well at a very slow rate. The oil is too viscous to be moved readily horizontally through the sand by liquid or gaseous reagents subjected to a reasonable pressure. After the necessary elements, i.e., a fracture 5, injection well 6, and producing well 7, have been placed within the formation 8, the path of least resistance to fluid flow from the formation to the producing well is downward into the fracture and thence into the producing well through the permeable fracture. With this in mind, a solvent, preferably one which is volatile at formation temperature and pressure, is delivered into the fracture from the injection well 6 under such conditions as to promote flow of the solvent through the permeable flow channel and thence into the producing well 7. This flow is continued usually in an increasing volume to wash and clean the sand adjacent the fracture, thus creating an enlarged drainage chamber 18 (Figure 2). If a volatile solvent is used, the volatile components of the solvent will move upward from the drainage area into the formation containing the viscous oil. There, it will dilute the oil, thus allowing the formation oil and the volatile component of the solvent to move downward into the drainage area at increased rates. From this area the mixture will be transported by the liquid component of the solvent into the producing well. This action is diagrammatically illustrated in Figure 3, wherein the arrows directed upward represent the direction of travel of the volatile component of the solvent and the arrows directed downward represent the travel of the mixture of solvent and oil.

The term "solvent," as employed in describing this invention, may broadly be any solvent for viscous petroleum oils. Examples include carbon tetrachloride, alcohols such as ethanol or the like, which are less viscous under reservoir conditions than the formation oil. The solvent may be a hydrocarbon such as gasoline, kerosene, or a more volatile, normally gaseous, liquefied hydrocarbon having from two to five carbon atoms. Other normally gaseous, liquefiable solvents include dichlorodifluoromethane, methyl chloride, dimethyl ether, sulfur dioxide, and methyl amine. The solvent could also be a mixture of the above mentioned agents. Small amounts of other materials such as methane may also be present. A preferred solvent, propane, has been selected for purposes of description.

The propane is injected into the fracture at a pressure above its vapor pressure under formation temperature in order to maintain the solvent principally in the liquid phase. Communication of the propane between the injection and the producing well is established through the permeable flow channel. As the propane is circulated, it dilutes the viscous formation oil in and adjacent the fracture and carries the oil to the producing well in solution. As increasing amounts of propane are circulated, the effective drainage chamber (the volume including the fracture and the formation adjacent the fracture which has been cleansed by the solvent action) is enlarged and a point is reached wherein the circulation of the propane is not longer commercially attractive due to the expense involved in operating the surface equipment. At this point the circulation may be discontinued and the pressure on the formation reduced to a value below the vapor pressure of propane at formation temperature. This is accomplished by making fluid withdrawals from the producing well after discontinuing injection of propane. When the formation pressure reaches the vapor pressure of the propane at formation temperature, or a few pounds below this value, the producing well is shut in. The formation is then maintained in a rest or dormant state.

The propane within the drainage chamber partially passes from the liquid to the gaseous phase. The formation is more permeable to gas flow than to liquid, therefore, the propane gas diffuses throughout the formation above the drainage chamber. The volatile gas in passing upward through the formation contacts the residual viscous oil diluting same and reducing its viscosity. As the oil is diluted and becomes less viscous it is rendered more mobile to gravitational forces and passes downward into the drainage chamber. When the gaseous propane dissolves in the viscous oil and the solution drains into the liquid propane the vapor pressure of the propane decreases. This phenomenon is evidenced by a drop in the formation pressure. The formation pressure may be observed by any of various known means such as a shut-in pressure gage, bottom hole pressure gage, or the like. The pressure drop directly indicates the amount of viscous oil dissolved within the liquid propane. The next step is to establish circulation of the propane between the injection well and the producing well, thus flushing the diluted oil-propane mixture into the producing well. The flushing step may sometimes be carried out using a material which is not readily soluble in oil such as nitrogen, carbon dioxide, water, or the like, which is used as a displacement medium. The above cycle may be repeated a number of times until it no longer yields an economic quantity of oil.

Upon reaching the economic limit of the above process, an additional amount of oil may be recovered by changing the direction of flow of propane through the drainage chamber. This is accomplished by using an alternate well as a producing well, using an alternate well as an injection well, or using alternate wells for both producing and injection wells. This change of direction of flow through the drainage area insures a more efficient purging of the flow channels as well as a more complete cleansing of the formation above the drainage chamber. The cyclic operation of circulating propane, as described above, may again be applied to the system using a different combination of injection and producing wells and once again will yield commercial quantities of oil.

In using a liquid solvent which is not normally volatile under reservoir conditions such as, for example, kerosene, alcohols, or the like, the solvent is injected into the fracture and allowed to remain in the fracture to penetrate the formation adjacent the fracture thus diluting the formation oil and reducing the formation oil viscosity. After sufficient contact time, the solvent and oil solution mixture is then produced from the producing well. The contact time will vary but may be easily determined by trial and error. This is accomplished by injecting an initial volume of solvent, waiting an increment of time and thereafter producing the solvent with a certain percentage of formation oil in solution therewith. The relative percents of the two components are determined and if the percent concentration of formation oil is not sufficient the next injected volume of solvent is left in contact with the formation a longer increment of time.

The propane is supplied to the fracture for two reasons, one of which is to transport the oil to the producing well. The second reason is to allow the propane and its vapors to dilute the formation oil rendering it less viscous. The second principle of reducing the oil's viscosity may be assisted by other means such as supplying heat. The heat may be supplied by either heating the propane or supplying a stream of heated gases or other medium in conjunction with the propane circulation or as a separate, individual step. This may also be accomplished by causing a combustion front to proceed through the fracture without consuming a substantial amount of oil within the formation, as set forth and claimed in U. S. Patent 2,734,579 Elkins.

In order to evaluate the operability and advantages of the present invention, experiments were conducted in a manner to simulate field conditions. In these experiments, a 1½ inch diameter sand column 30 inches in length was prepared consisting of unconsolidated sand. The sand used in the preparation of the sand column was No. 16 "Ottawa" sand of 140–230 U.S. Standard Sieve size and was packed to form a sand column having a porosity of 34 percent and a permeability of 3 darcys.

The first step of the experiment consisted of saturating the pore space of the sand column with an asphaltic base crude obtained from eastern Kansas. The crude oil had a viscosity of 637 centipoises at a temperature of 75° F. The oil would not flow from the sand column in detectable amounts under room temperature and pressure due to its high viscosity. The sand column holder 19 (Figure 4) encompassing the sand column 20, was constructed with a chamber 21 simulating the fracture. The sand column thus represents the formation and the chamber 21 represents a fracture within the lower portion of the formation. The sand column was thus in a condition simulating that to be expected in a viscous oil formation in which the oil is so viscous that very high pressures are required to promote horizontal flow. Thereafter, application of the process of this invention was initiated.

Figure 4:
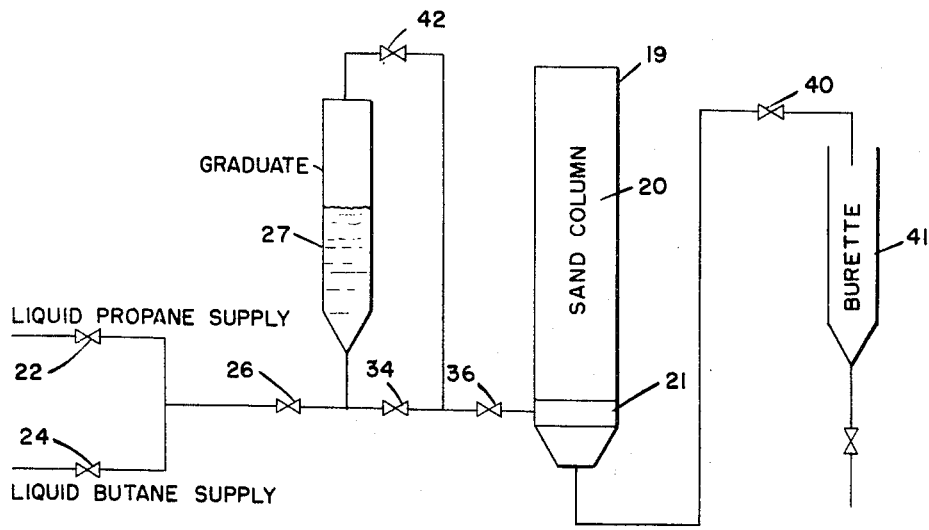
Figure 4 is a diagrammatic view of the arrangement of laboratory apparatus for carrying out an experiment to determine the ultimate oil recovery under simulated formation conditions.

In the embodiment shown in Figure 4, all the laboratory apparatus valves were initially closed. Liquid butane valve 24 and line valve 26 were opened to admit butane to the graduated vessel 27, hereinafter referred to as "graduate" for reasons of brevity. An initial butane charge was placed in the graduate 27 after which the liquid butane valve 24, and line valve 26 were closed and a reading was taken of the quantity of butane entrapped in the graduate. The graduate exit valve 34 and the fracture entrance valve 36 were then opened, thus allowing a charge of liquid butane to enter the fracture chamber 21 of the sand column holder 19. The charge of butane which varied from 44 to 240 cubic centimeters was left in contact with the lower end of sand column 20 for varying intervals of contact time. The interval of time used varied from 1 to 95 hours. After sufficient contact time had elapsed, as evidenced by the collection of crude oil in the fracture chamber 21, the graduate exit valve 34 and fracture entrance valve 36 were closed and the burette entrance valve 40 was opened allowing the residual pressure in the sand column holder 19 to move the recovered crude from the chamber 21 into the burette 41. The upper end of the burette was open to atmospheric pressure and thus the butane in the crude was allowed to evaporate after which a reading of the collected crude was taken and recorded. The cycle was completed by closing the burette entrance valve 40. This cycle was repeated a number of times until approximately ½ of the oil originally in the sand column was recovered.

The next step was to introduce a butane vapor atmosphere to the lower end of the sand column 20 in lieu of the butane liquid charge previously used. This was accomplished by filling the graduate 27 as above explained and taking a liquid butane reading after which the graduate vapor exit valve 42 and fracture entrance valve 36 were opened to admit the butane vapor atmosphere within the graduate 27 into the fracture chamber 21. This charge of butane vapor was maintained until the level of the liquid within the graduate had dropped approximately 20 cubic centimeters. The time required for this step varied from 1 to 215 hours. After sufficient contact time had elapsed the graduate exit valve 42 and the fracture entrance valve 36 were closed and the burette entrance valve 40 was opened thus allowing the residual pressure within the sand column holder 19 to move the recovered oil from the chamber 21 to the burette 41. This cycle was completed by closing the burette entrance valve 40. A reading was taken of the recovered oil and this was recorded. The following chart represents the results of the first experiment conducted in the laboratory under simulated field conditions.

| Phase | Butane solvent | | | | Formation oil, cc. | | | |
|---|---|---|---|---|---|---|---|---|
| | Number of charges | Charge size, cc. | | | Recovered | | Residual | Contact time, hrs. |
| | | Max. | Min. | Cum. | Net | Cum. | | |
| Liquid | 13 | 151 | 44 | 1,043 | 130.7 | 130.7 | 135.3 | 190½ |
| Vapor | 7 | 20 | 20 | 1,183 | 52.0 | 182.7 | 83.3 | 140½ |
| Liquid | 2 | 227 | 240 | 1,650 | 38.0 | 220.7 | 45.3 | 120½ |
| Vapor | 2 | 20 | 20 | 1,690 | 15.0 | 235.7 | 30.3 | 383 |

A second experiment was conducted with the same apparatus using propane vapor in lieu of butane and a mineral oil with a viscosity of 128.7 cps. at 75° F. in lieu of crude from eastern Kansas. This experiment was carried out to determine the relative efficiencies of the two solvents. A comparison of the two experiment results appears in the following chart.

| Cumulative oil recovery, cc. | Butane solvent | | Propane solvent | |
|---|---|---|---|---|
| | Contact time, hours | Cum. Used, cc. | Contact time, hours | Cum. used, cc. |
| 5 | 5 | 137 | 13 | 17 |
| 10 | 15 | 211 | 26 | 32 |
| 15 | 24 | 240 | 50 | 42 |
| 20 | 31 | 295 | 230 | 48 |

It is readily seen from the above comparison that propane vapor was approximately six times more effective than liquid butane comparing the volume of solvent circulated per volume of oil recovered for the two solvents under the conditions of the two tests.

The example given above is applicable to a thin zone with uniform permeability profiles. Frequently formations are encountered which contain relatively impervious thin stringers. These impervious stringers restrict the application of the invention to each zone between the stringers. Thus, each permeable zone is considered as a separate formation in applying the principle above outlined and a separate transportation fracture is formed in the lower portion of each zone. An example would be a formation whose top is found at 1000 feet below the surface and terminates at 1100 feet below the surface. An examination of the well data such as core analysis, sample analysis, well logs, etc., reveals an impervious stringer from 1025 feet to 1027 feet and another such stringer from 1059 feet to 1065 feet. In applying this invention to a formation of this type the zone from 1000 feet to 1025 feet is considered as a formation in itself and a fracture is created immediately above the stringer starting at 1025 feet. The process is then applied to this zone independent of the lower zones. Thus we have three zones from 1000–1025 feet, from 1027–1059 feet and a third from 1065–1100 feet which will be treated as if they existed as separate and distinct formations.

It will be understood that numerous modifications and variations in the systems of production outlined above can be carried out without departing from the spirit of this invention, which is best defined by the scope of the appended claims.

We claim:

1. A method of recovering naturally occurring viscous hydrocarbon oil from an underground formation, said formation having in communication therewith at least one producing well and at least one injection well, said method including the steps of forming a permeable flow channel in the lower portion of said formation, said flow channel including at least one formation fracture extending from one of said wells toward the other of said wells and substantially parallel to the bottom of said formation, injecting a liquefied normally gaseous solvent for said oil at a pressure above the vapor pressure of said solvent at formation temperature into said injection well through said flow channel, and reducing the pressure of said solvent to a value less than the vapor pressure of said solvent at formation temperature, whereby the vapors from said solvent pass upward into the overlying formation contacting said oil and rendering said oil less viscous and increasing the rate of drainage of said oil into said flow channel, thereafter increasing the pressure of said solvent to a value above the vapor pressure of said solvent at formation temperature, and increasing the flow of said solvent through said flow channel whereby said solvent dissolves and carries said oil to said producing well from which said solvent and said oil may be recovered.

2. The method of claim 1 in which said liquefied normally gaseous solvent is a hydrocarbon having from 2 to 5 carbon atoms per molecule.

3. A method of recovering naturally occurring viscous hydrocarbon oil from an underground formation, said formation having in communication therewith at least one producing well and at least one injection well, said formation having a permeable flow channel in the lower portion thereof, said flow channel including at least one formation fracture extending from one of said wells toward the other of said wells and substantially parallel to the bottom of said formation, comprising injecting a liquefied normally gaseous solvent for said oil at a pressure above the vapor pressure of said solvent at formation temperature into said injection well and through said flow channel, and reducing the pressure of said solvent to a value less than the vapor pressure of said solvent at formation temperature, whereby the vapors from said solvent pass upward into the overlying formation, contacting said oil and rendering said oil less viscous and increasing the rate of drainage of said oil into said flow channel, thereafter increasing the pressure of said solvent to a value above the vapor pressure of said solvent at formation temperature, and increasing the flow of said solvent through said flow channel whereby said solvent dissolves and carries said oil to said producing well from which said solvent and said oil may be recovered.

4. The method of claim 3 in which said solvent is a liquefied normally gaseous hydrocarbon having from 2 to 5 carbon atoms per molecule.

References Cited in the file of this patent

UNITED STATES PATENTS

| Re. 23,733 | Farris | May 13, 1952 |
| 1,422,204 | Hoover et al. | July 11, 1922 |
| 2,412,765 | Buddrus et al. | Dec. 17, 1946 |
| 2,754,911 | Spearow | July 17, 1956 |

FOREIGN PATENTS

| 669,216 | Great Britain | Mar. 26, 1952 |
| 696,524 | Great Britain | Sept. 2, 1953 |